United States Patent
Ulrich, III et al.

(10) Patent No.: US 6,647,079 B1
(45) Date of Patent: Nov. 11, 2003

(54) SURFACE ACOUSTIC WAVE-BASED CLOCK AND DATA RECOVERY CIRCUIT

(75) Inventors: William J. Ulrich, III, Baltimore, MD (US); Mark Lucas, Linthicum, MD (US); Cecil Smith, Annapolis, MD (US); Bradley Kanack, Sykesville, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/443,198

(22) Filed: Nov. 18, 1999

Related U.S. Application Data

(60) Provisional application No. 60/109,000, filed on Nov. 18, 1998.

(51) Int. Cl.[7] .............................. H04B 1/10; H04B 14/04

(52) U.S. Cl. ........................ 375/354; 375/327; 375/373; 375/371; 375/376

(58) Field of Search ................................. 375/327, 373, 375/371, 376, 354

(56) References Cited

U.S. PATENT DOCUMENTS

| | | | | |
|---|---|---|---|---|
| 4,715,049 A | * | 12/1987 | Andrews et al. | ............. 375/354 |
| 5,512,860 A | * | 4/1996 | Huscroft et al. | ............. 331/1 A |

* cited by examiner

*Primary Examiner*—Stephen Chin
*Assistant Examiner*—Guillermo Munóz
(74) *Attorney, Agent, or Firm*—David L. Soltz

(57) ABSTRACT

In accordance with an aspect of the present invention, a circuit is provided which is configured to recover clock and data streams from an incoming signal. The circuit comprises a multiplexer having first and second inputs, and an output. The first input is configured to receive the incoming signal, and the second input is configured to receive a reference clock signal, while the output selectively supplies one of the incoming and reference clock signals. A toggling circuit, such as a flip-flop, and a frequency multiplier circuit are further provided which are coupled to the multiplexer output. A filter circuit is coupled to the frequency multiplier circuit, and the output of the filter circuit is coupled to a second input of the toggling circuit. Moreover, the output of the filtering circuit corresponds to the recovered clock stream, and an output of the toggling circuit corresponds to the recovered data stream.

5 Claims, 3 Drawing Sheets

SURFACE ACOUSTIC WAVE-BASED CLOCK AND DATA RECOVERY CIRCUIT

The present application claims the benefit of U.S. Provision Patent Application Serial. No. 60/109,000, filed Nov. 18, 1998.

FIELD OF INVENTION

The present invention relates generally to communication systems and more particularly to a clock and data recovery circuit, which can be used in such systems employing a self oscillating surface acoustic wave filter.

BACKGROUND OF INVENTION

Surface Acoustic Wave (SAW) filter based clock and data recovery (CDR) circuits generate a clock for retiming data received in connection with communication networks. Systems, subsystems and associated devices rely on these types of clock circuits to function properly.

When data is lost in a phase-locked loop PLL CDR, the PLL frequency can be directly used as the system clock. The accuracy of this clock is dependent upon the reference clock used to lock the PLL. Surface acoustic wave (SAW) based clock and data recovery (CDR) circuits may also be used. A disadvantage with SAW based CDRs is the fact that when data is lost, so is the clock.

One solution to this loss of clock problem is a self oscillation SAW based CDR. However, a drawback associated with this self oscillating SAW is that operation could not be guaranteed within ITU specifications of +/−20 ppm. Delay circuits in the feedback path of the self oscillation could be adjusted in order to obtain +/−20 ppm accuracy for the frequency, but without a precise reference, such as a crystal, it would be difficult to be assured of the proper operating frequency.

A shortcoming associated with the PLL based approach is circuit complexity, power consumption and performance. PLL based circuits require a considerably higher level of circuit complexity due to the requirement that a voltage controlled oscillator (VCO) is locked to some multiple of the reference clock or data, a frequency/phase detector to generate a frequency error signal and some integrator to set the jitter transfer bandwidth. It is this complexity, not present in the SAW based solution, that gives the SAW based solutions an advantage in die size and thereby cost and power consumption. Another advantage associated with a SAW based solution is enhanced performance since it does not suffer from the 1/f noise of the PLL approach. In addition, SAW based solutions do not pick up as much board noise as the PLL solution.

SUMMARY OF THE INVENTION

In accordance with an aspect of the present invention, a circuit is provided which is configured to recover clock and data streams from an incoming signal. The circuit comprises a multiplexer having first and second inputs, and an output. The first input is configured to receive the incoming signal, and the second input is configured to receive a reference clock signal, while the output selectively supplies one of the incoming signal and said reference clock signal. A toggling circuit, such as a flip-flop as well as a frequency multiplier circuit are further provided which are coupled to the multiplexer output. A filter circuit is coupled to the frequency multiplier circuit, and the output of the filter circuit is coupled to a second input of the toggling circuit. Moreover, the output of the filtering circuit corresponds to the recovered clock stream, and an output of said toggling circuit corresponds to the recovered data stream.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION OF INVENTION

Figure 1:
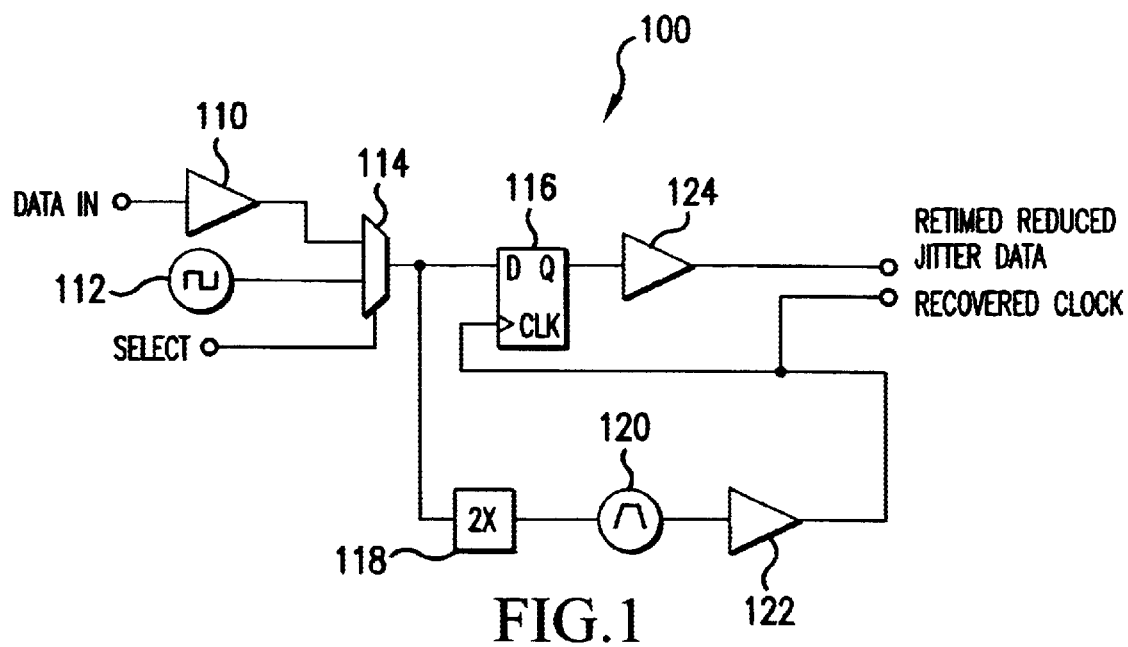
FIG. 1 illustrates a clock multiplier/CDR circuit consistent with a feature of the present invention.

Turning to the drawings in which like reference characters indicate the same or similar elements in each of the several views, FIG. 1 is a schematic representation of circuit 100 where a CDR chip is used in combination with a reference clock 112. In particular, data is input to receiver 110 having appropriate known pulse shaping circuitry to thereby about a train of data pulses to multiplexer 114, which also receives a clock signal from reference clock 112. In response to a select signal based on detected errors in the data signal, multiplexer 114 outputs one of the reference clock signal or the data signal output from receiver 110. The output form multiplexer 114 is coupled to the D input of toggling or flip-flop 116, as well as an input to a 2× frequency multiplier circuit. The frequency multiplexer circuit, in turn, has an output coupled to a filter circuit, such a SAW filter circuit 120, which feed the multiplied and filtered output from multiplexer 114 to amplifier 122. The output from amplifier 122 is fed to a CLK input of flip-flop 116, and corresponds to a recovered clock signal associated with the data signal input to circuit 100. A signal supplied by the Q output of flip-flop 116 is fed to driver 124, and then output as recovered data from the incoming data signal.

Reference clock 112 is a sub-harmonic of the desired clock frequency. When loss of data occurs, as monitored on the optical receiver and the RF power monitoring circuit, the reference clock is switched into the data path. Here, circuit 100 is being used as a clock multiplier and a high gain path. The reference clock is AC coupled to the inverted data input along with the DC decision level threshold voltage. The data output from circuit 100 is retimed and has reduced jitter.

Figure 2:
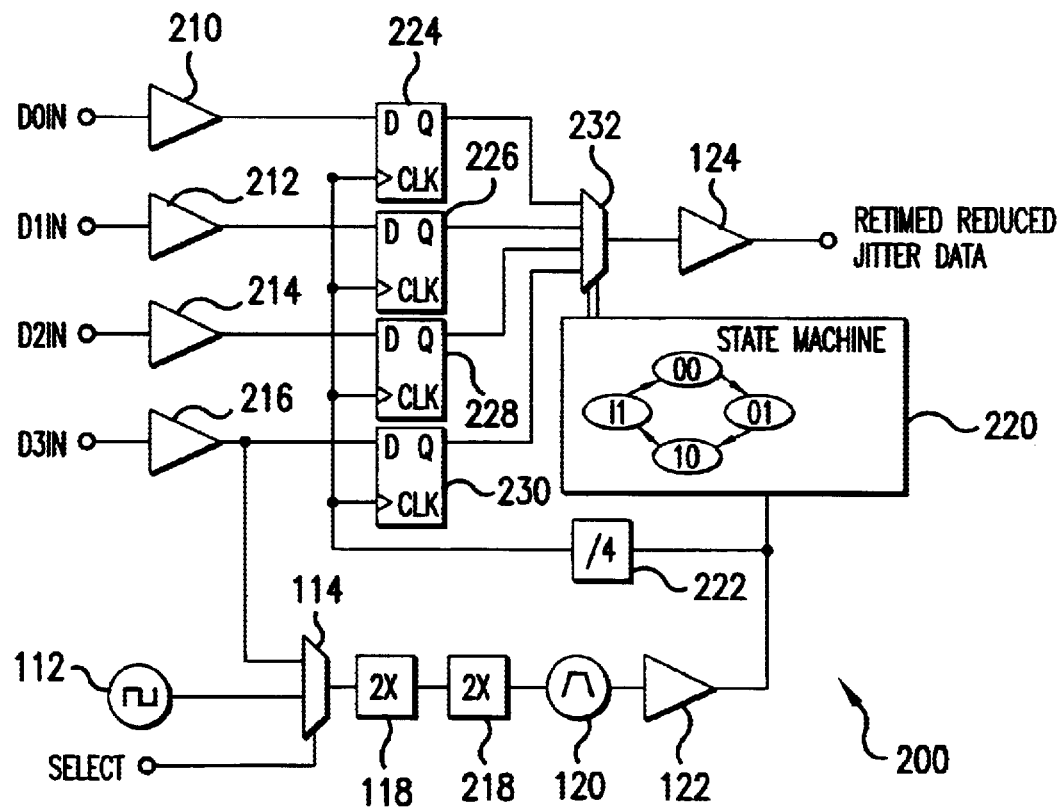
FIG. 2 illustrates a 1:4 time division multiplexer consistent with an additional feature of the present invention.

FIG. 2 illustrates a 1:4 time division multiplexer 200 in accordance with a feature of the present invention. Multiplexer 200 includes some of the same elements as CDR circuit 100 discussed above, but also includes input receivers 210, 212, 214 and 216, respectively coupled to inputs of flip-flops 224, 226, 228 and 230. The output of receiver 216 is coupled to multiplexer 114, which, in turn, feeds two 2× frequency multiplier circuits 118 and 218. The output of amplifier 122, in the embodiment shown in FIG. 2 is coupled to a state machine for controlling multiplexer 232 and a ÷4 circuit 222. The output of circuit 222 is supplied to CLK inputs of flip-flops 224, 226, 228 and 230.

The Q outputs of flip-flops 224, 226, 228 and 230 are multiplexed by multiplexer 232 and output through driver 124.

Figure 3:
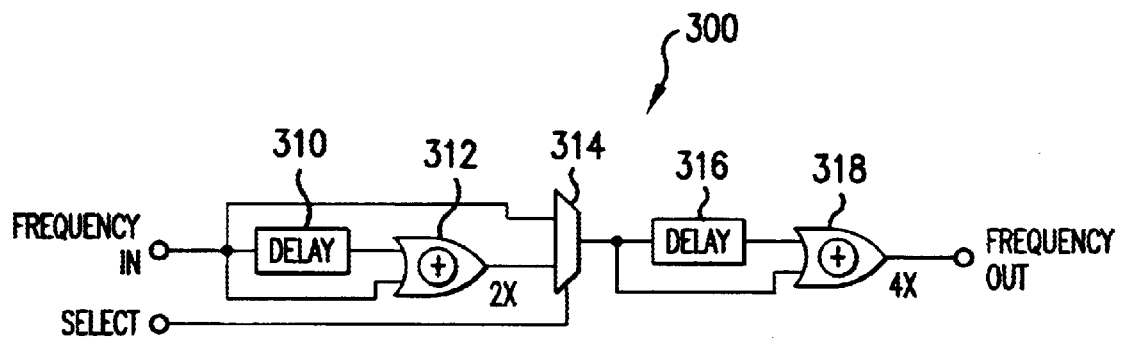
FIG. 3 illustrates a selectable frequency multiplier circuit consistent with the present invention.
Figure 4:
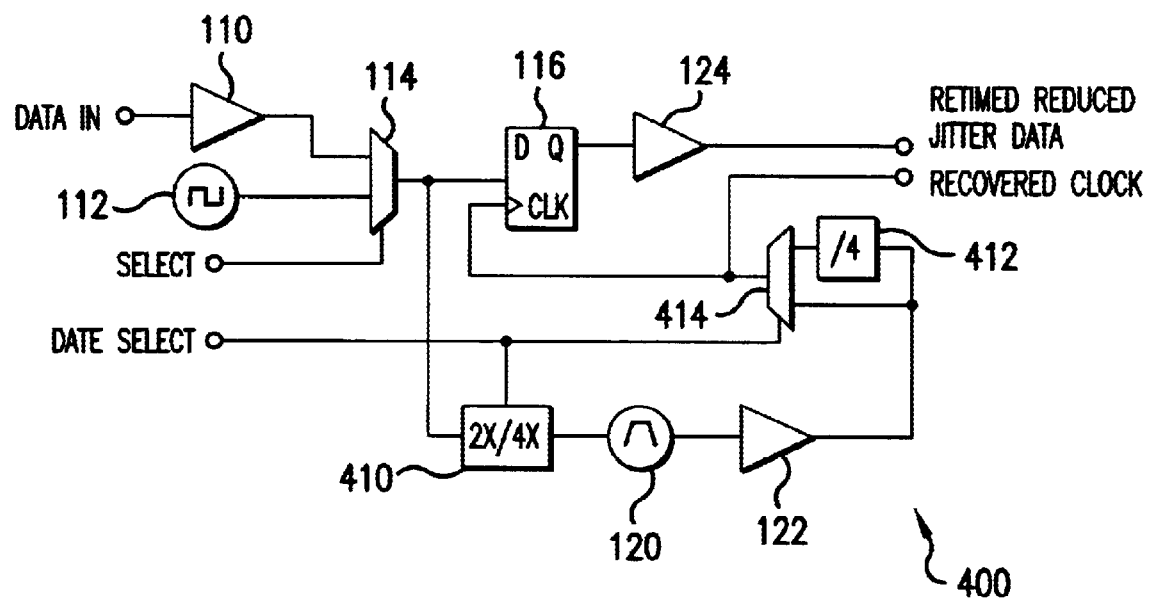
FIG. 4 illustrates a selectable data rate CDR circuit in accordance with an aspect of the present invention.
Figure 5:
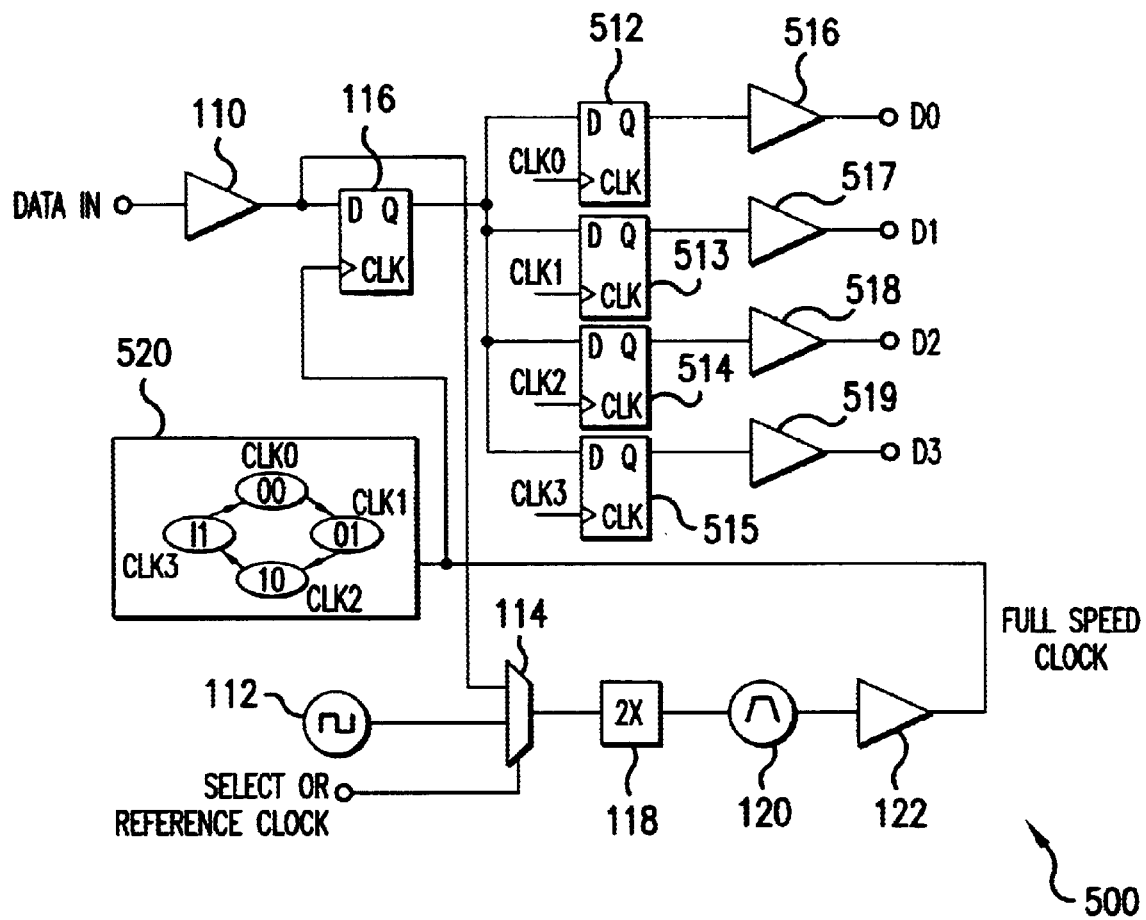
FIG. 5 illustrates a 1:4 time division demultiplexer circuit in accordance with a further aspect of the present invention.

Although FIG. 2, as well as FIGS. 3–5, illustrates particular multiplexers and demultiplexer configurations, the principles of the present invention can be applied to varying numbers of inputs and outputs. Since the data is at a lower frequency, two frequency multiplier circuits are cascaded to generate more energy at the clock frequency. In this configurations, two delays are present. The exact delay time is dependent upon the actual input and output frequencies, however, the first delay is nearly double the second delay. Also, it is important to keep the delays such that the output waveform is as near as possible to a 50% duty cycle. This ensures that there will be more energy in the recovered clock frequency harmonic. At some data rates, the required delays may be too long to be integrated on chip, therefore the delay line can be external to the chip. There also may be various filtering and amplification functions desirable in the multiplier path to improve performance. This SAW based design maintains a delay from data edge to recovered clock edge. Once the clock is recovered, the entire chip can then run synchronously from the recovered clock. In this embodiment, the D0–D3 inputs to receivers 210, 212, 214, and 216, respectively, are phase aligned and synchronous. If this is not the case, various elastic buffer, pointer techniques and bit stuffing occur first to insure phase alignment. Any of the D0–D3 inputs could be used as the source for the frequency multiplier circuit. Also, other multiplication factors could be used, even odd numbers. Alternatively, this SAW based design can include a SAW filter interposed between the pair of frequency doublers 118 and 218.

SAW based variable frequency CDR's require a selectable multiplier circuit. FIG. 3 is a schematic representation of a selectable multiplier circuit that could be used with a multirate CDR. In FIG. 3, a signal is input having a given frequency and supplied to a first input of an exclusive OR gate 312, while a delayed signal, generated by circuit 310, is supplied to a second input of exclusive OR gate 312. The signal is also fed to a first input of multiplexer 314, while the output of exclusive OR gate 312 is provided to a second input of multiplexer 314, which selectively outputs one of these signals in response to a select signal. The output of multiplexer 314 is delayed by circuit 316 and fed to a first input of a second exclusive OR gate 318, while the undelayed output is supplied directly to a second input of exclusive OR gate 318 to yield a four-fold increase in the output frequency over the input frequency.

With respect to the aspect of the invention shown in FIG. 3, the multiplication factor does not need to be even or base 2, but is practical to obtain high multiplication factors with minimum hardware and complexity.

FIG. 4 is a schematic representation of a selectable data rate clock and data recovery circuit 400, and is similar to the embodiment shown in FIG. 1. The embodiment shown in FIG. 4, however, further includes a 2×/4× frequency multiplier coupled in series with SAW filter 120, as well as multiplexer 414 and 4 circuit 412 to output clock frequencies having different rates depending on rate select signal supplied to multiplexer 414. In this embodiment, a single device, board and system is configured to handle various data rates.

FIG. 5 is a schematic representation of a SAW based 1:4 time division demultiplexer 500. Demultiplexer circuit 500 includes components 110, 112, 114, 118, 120 and 122, described above. In circuit 500, however, the recovered clock signal is supplied to state machine 520, which generates clock signals CLK0–CLK3 to flip-flops 512–515, each of which also receives a signal from the Q output of flip-flop 116 at respective D inputs. The Q outputs of flip-flops 512–515 are respectively supplied to drivers 516 to 519 to supply data streams D0 to D3.

The data stream outputs from drivers 516 to 519 are not required to be in any particular order, D0–D3. If this is not the case, a framing signal would be required to align the serial data bit D0 to the parallel data bit D0, in which case all other data streams would be aligned.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. A circuit configured to recover clock and data streams from an incoming signal, comprising:

a multiplexer having first and second inputs, and an output, said first input being configured to receive said incoming signal, and said second input being configured to receive a reference clock signal, said output selectively supplying one of said incoming signal and said reference clock signal;

a toggling circuit coupled to said multiplexer output, said one of said incoming signal and said reference clock signal being supplied to a first input of said toggling circuit;

a frequency multiplier circuit coupled to said output of said multiplexer; and a filter circuit coupled to said frequency multiplier circuit, an output of said filter circuit being coupled to a second input of said toggling circuit, said output of said filtering circuit corresponding to said recovered clock stream, and an output of said toggling circuit corresponding to said recovered data stream.

2. A circuit in accordance with claim 1, wherein said filter circuit comprises a surface acoustic wave filter.

3. A circuit in accordance with claim 1, wherein said toggling circuit comprises a flip-flop.

4. A circuit in accordance with claim 3, wherein said output of said filter circuit is coupled to a CLK input of said flip-flop circuit, and said output of said multiplexer circuit is coupled to a D input of said flip-flop circuit.

5. A circuit in accordance with claim 1, further comprising an amplifier circuit interposed between said filter circuit and said second input of said toggling circuit.

* * * * *